United States Patent [19]
Cerutti et al.

[11] 3,986,857
[45] Oct. 19, 1976

[54] POSITIVE CONTAINMENT THRESHOLD FOR USE IN GLASS MANUFACTURING APPARATUS

[75] Inventors: Richard L. Cerutti, Seminole; Joseph A. Gulotta, New Kensington, both of Pa.

[73] Assignee: PPG Industries, Inc., Pittsburgh, Pa.

[22] Filed: Feb. 12, 1975

[21] Appl. No.: 549,214

Related U.S. Application Data

[63] Continuation-in-part of Ser. No. 455,441, March 27, 1974, Pat. No. 3,898,069.

[52] U.S. Cl. .............................. 65/182 R; 65/186; 65/338; 65/374 RM
[51] Int. Cl.² ..................... C03B 18/02; C03B 5/22
[58] Field of Search ........... 65/182 R, 374 RM, 184, 65/185, 186, 338, 99 A

[56] References Cited
UNITED STATES PATENTS

| | | |
|---|---|---|
| 1,548,444 | 8/1925 | Corl .......................... 65/374 RM X |
| 2,015,791 | 10/1935 | Gelstharp et al. ......... 65/374 RM X |
| 3,843,344 | 10/1974 | Galey ............................ 65/182 R X |
| 3,843,346 | 10/1974 | Edge et al. .................... 65/182 R X |

*Primary Examiner*—Robert L. Lindsay, Jr.
*Attorney, Agent, or Firm*—E. Kears Pollock

[57] ABSTRACT

A positive containment threshold for use in an apparatus for manufacturing flat glass includes a metal base with a combination of vertically disposed members for connection to a bottom casing of a glass forming chamber. Disposed adjacent a vertical member which serves as an end wall casing member in the combination is at least one refractory threshold block which provides a smooth glass contact surface over which molten glass may be delivered onto a pool of molten metal contained within the bottom portion of an enclosed forming chamber. This threshold in combination with the casing surrounding the bottom portion of an enclosed forming chamber provides an impervious barrier to prevent the inadvertent loss of molten metal from the container in the event of refractory failure.

10 Claims, 3 Drawing Figures

POSITIVE CONTAINMENT THRESHOLD FOR USE IN GLASS MANUFACTURING APPARATUS

CROSS REFERENCE TO RELATED APPLICATIONS

This application is a continuation-in-part of application Ser. No. 455,441 filed Mar. 27, 1974, now U.S. Pat. No. 3,898,069, granted Aug. 5, 1975. The disclosure of that patent is incorporated by reference herein.

BACKGROUND OF THE INVENTION

1. Field of the Invention

The present invention relates to apparatus for the manufacture of flat glass wherein the glass is formed while being supported on a surface of a pool of molten metal following delivery thereto as molten glass flowing in a substantially horizontal stream from a glassmaking furnace. More particularly, this invention relates to a combination of elements comprising suitable means for supporting molten glass during its delivery onto such a pool of molten metal.

2. Brief Description of the Prior Art

It is known that molten glass can be delivered onto molten metal and formed into a continuous ribbon or sheet of glass according to the teachings of Heal, U.S. Pat. No. 710,357; of Hitchcock, U.S. Pat. No. 789,911; of Pilkington, U.S. Pat. No. 3,083,501 and U.S. Pat. No. 3,220,816. In all of the prior art, molten glass is delivered over some rigid element, usually a refractory member, onto molten metal. In the practice disclosed by Pilkington, the molten glass is delivered through a long, narrow canal and over a lip from which the molten glass falls onto the molten metal and spreads outwardly on the molten metal. The forming chamber containing the molten metal extends upstream toward the source of molten glass in the apparatus disclosed by Pilkington. In the method of Hitchcock, the molten glass is delivered over a refractory wall onto molten meal contained in a forming chamber adjacent to such a refractory wall downstream of the furnace in which the molten glass is prepared. In the method of Heal, molten glass is delivered over a refractory bridge.

According to the disclosure of Hitchcock in U.S. Pat. No. 1,564,240 the molten metal on which glass is to be formed into a continuous sheet may be contained within a forming chamber comprising a metal casing. As described in U.S. Pat. Nos. 3,584,475 and 3,594,147 to Galey and Sensi, this metal casing may be provided with a refractory liner. Refractory-lined metal casing structures are shown and described in U.S. Pat. No. 3,584,477 to Hainsfurther.

The bottom portion of a typical forming chamber which contains molten metal on which glass is to be formed includes a bottom, side members and end members and is in the form of an open-topped box. A top portion of a typical forming chamber includes a top, sides and end which are sealed to the bottom portion in order to provide an enclosed forming chamber. Because the canal and lip through which and over which molten glass flows prior to being deposited on the molten metal extends above the surface of the molten metal and inwardly from the inlet end of a forming chamber over the molten metal, it is quite easy in a mechanical sense to provide a casing for the bottom portion of a forming chamber such as described by Pilkington, Hainsfurther or Galey and Sensi. Such a casing extends above the intended level for the molten metal pool within such a forming chamber.

According to the teachings of Hitchcock, molten glass is delivered directly through a front wall in a furnace and onto molten metal in an enclosed forming chamber. The front wall of the furnace is a common wall to the enclosed forming chamber, constituting an inlet end wall thereof. Because of the necessarily high temperature of molten glass in the furnace as it is delivered to the enclosed forming chamber, this common wall is necessarily a refractory wall. Such a wall is subject to deterioration during use and it may be readily observed that any leak developing in such a common wall beneath the level of the surface of the molten metal pool within the enclosed forming chamber will result in the loss of molten metal into the bottom of the adjacent glassmaking furnace. This is so since the molten metal is fluid and is more dense than molten glass. In the apparatus of Heal, molten glass is delivered over a refractory bridge. Failure of the downstream wall of the bridge would result in a massive loss of molten metal.

The apparatus disclosed in Heal and that disclosed in Hitchcock are not provided with means for supporting a stream of molten glass for delivery onto molten tin which can be maintained or replaced when worn without requiring a tear-down and replacement of the entire front wall of a glassmaking furnace. As disclosed in a copending application of Charles E. Edge and Gerald E. Kunkle, bearing Ser. No. 455,463, entitled "Flat Glass Manufacturing Apparatus and Method" filed on Mar. 27, 1974, now U.S. Pat. No. 3,893,346 and incorporated by reference herein, it is desirable to provide a means for delivering molten glass from a glassmaking furnace to a glass forming chamber that is sufficiently independent of either the glassmaking furnace or the glass forming chamber so that it may be individually maintained. Thus, it is desirable to provide a molten glass delivery means that includes a bottom portion that effectively extends the bottom portion of the glassmaking furnace and is connected to the bottom of a glass forming chamber. Such a delivery means also includes side members and a roof which is connected to both the glassmaking furnace and the glass forming chamber. The delivery means further includes means for metering the flow of molten glass through it in order to control the rate of glass production.

In the patent of Edge and Kunkle which is incorporated by reference herein, there is a description of a suitable apparatus for delivering molten glass from a glassmaking furnace to a glass forming chamber. Such an apparatus comprises a bottom threshold member, side members of jambs extending upwardly from the threshold member and a metering member extending downwardly toward the threshold member. These elements, in combination, define an opening through which molten glass may flow. The threshold member preferably rests on an extended section of the front wall of a glassmaking furnace and against the inlet end of a glass forming chamber. As will be seen from the description which follows, the present invention provides a threshold member having particularly desirable characteristics.

SUMMARY OF THE INVENTION

A glass forming chamber is provided with an impervious shell or casing surrounding its lower portion. The casing is lined with refractory or like material that is substantially inert to molten metal, and the lined casing contains a pool of molten metal, such as molten tin, upon which flat glass may be formed. This invention provides an extended bottom casing or shell at the inlet end of the forming chamber. This extension of the bottom casing underlies a metering member or tweel for controlling the rate of molten glass delivery to the forming chamber and includes within it a threshold over which molten glass is delivered.

The extension of the bottom casing includes a bottom member which may be a plate of metal such as steel or the like that is part of or welded to the bottom of the main chamber casing. Alternatively, the bottom member may be a cooler, preferably a box-like structure, connected to the bottom of the main chamber casing. The extension of the bottom casing also includes an upstanding end member and two upstanding side members connected to the sides of the main chamber casing. The end member and side members preferably have heights sufficient so that their uppermost portions are above the upper surface off the molten metal pool in the chamber although the end member in particular may be slightly shorter without incurring any great risk of a substantial molten metal leak.

The upstanding members, particularly the end member, may be coolers having box-like structures for example. If desired, the upstanding members may simply be plates. The end member may be provided with a protective covering to prevent its dissolution by molten glass. As in the threshold assembly claimed in the parent of this application, the protective covering may be a separate refractory piece constituting a part of the glass supporting threshold. The end member may have a protective covering that is a relatively thin layer of refractory metal, such as platinum, or a refractory cermet, such as molybdenum disilicide, bonded to it. The end member, if cooled sufficiently, may be made of steel without creating any undue problem of its dissolution.

In a preferred embodiment of this invention the bottom member of the casing extension overlies and rests upon a front basin wall of a glass melting and refining furnace. This provides an overall integrated structure including the furnace and forming chamber joined in such a way that part of a threshold in the casing is beneath molten glass that is in free communication with a pool of molten glass in the furnace and part of the threshold is beneath molten glass as it is delivered onto the molten metal of the forming chamber. This provides a substantially horizontal, or slightly downwardly sloping, molten glass delivery channel defined by the threshold, the tweel, and upstanding refractory side members or jambs at each side of the chamber adjacent the ends of the threshold.

This preferred embodiment just described is conveniently maintained and provides for positive containment of both molten glass and molten metal within the combined furnace forming chamber structure. The impervious casing, by being extended over the basis wall of the molten glass-containing furnace, will direct any molten metal that might leak through the refractory liner toward the furnace rather than out of the structure. Casing integrity is easily maintained beneath the forming chamber where it is exposed and cooled naturally by the ambient atmosphere, and if, due to attack on the exposed end member of the casing or otherwise, molten glass should begin to leak about the basin wall, the leak will quickly seal itself by the glass solidifying as it is cooled by the ambient atmosphere beneath the casing.

This invention may be more fully understood with reference to the accompanying drawings.

DESCRIPTION OF THE PREFERRED EMBODIMENTS

Figure 1:
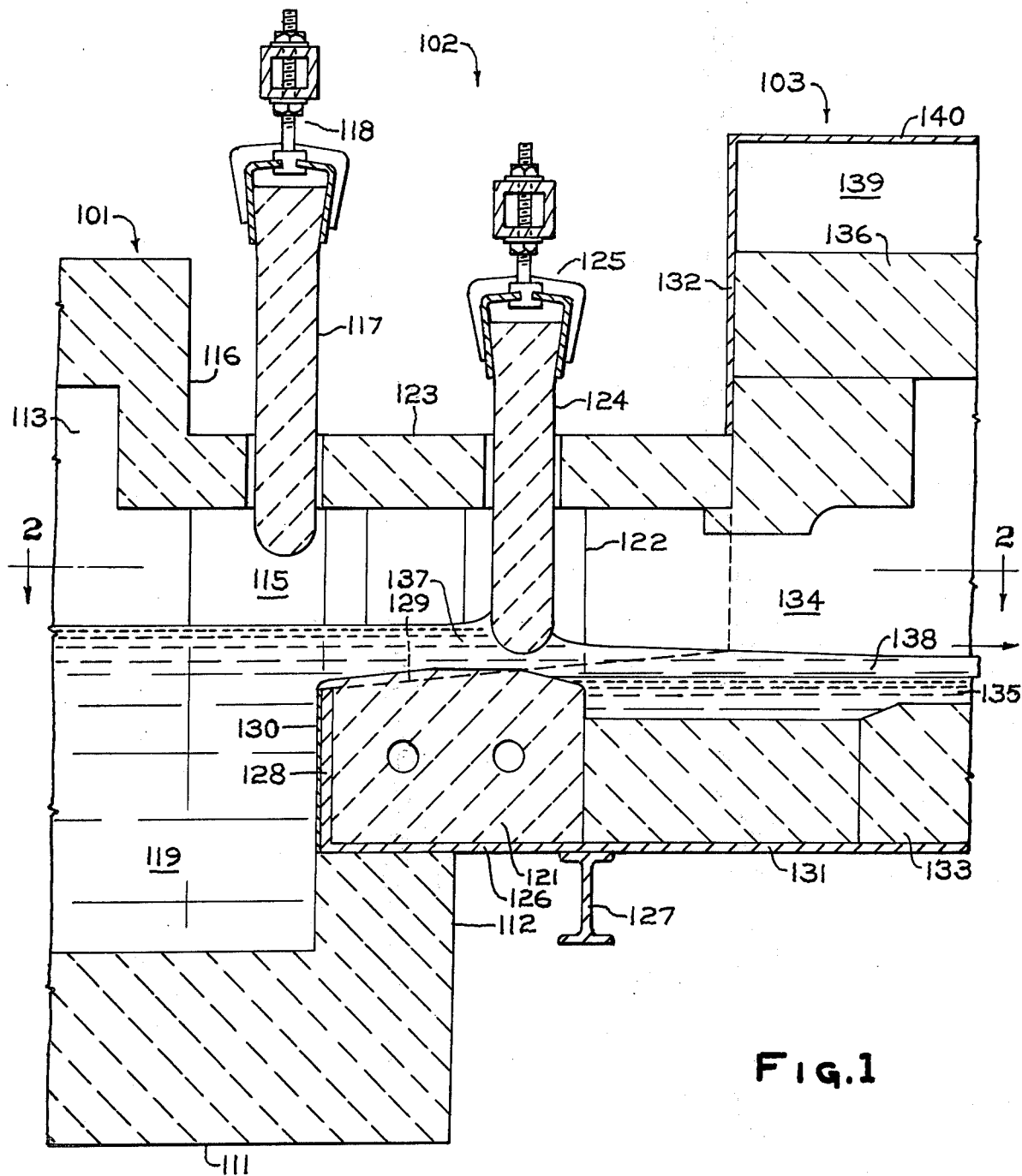
FIG. 1 is a longitudinal, sectional elevation view of the portion of a glass furnace and glass forming chamber combination that includes the improvement disclosed here.
Figure 2:
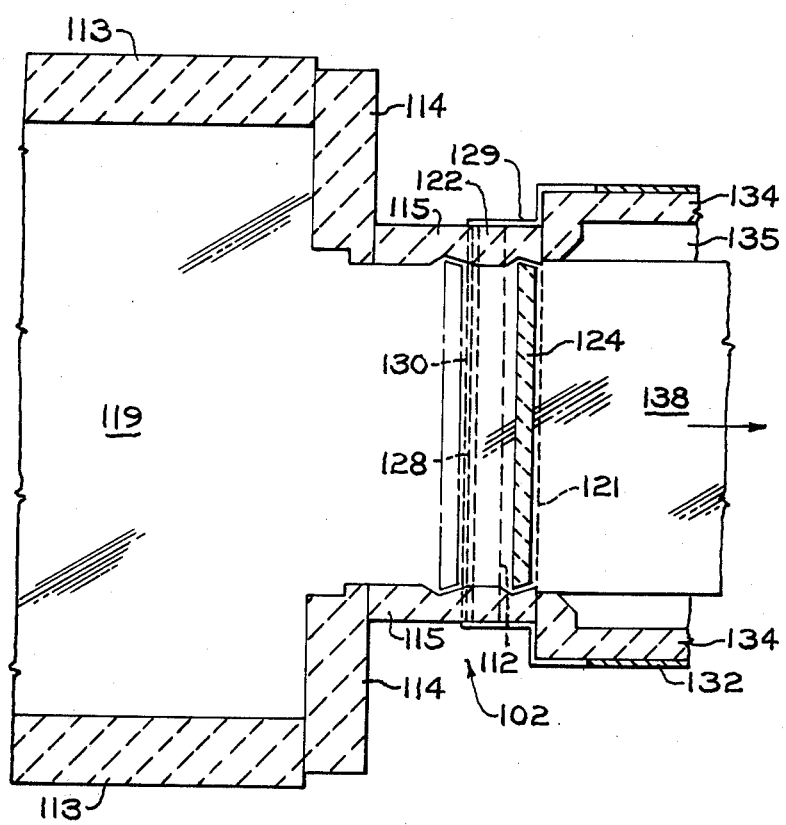
FIG. 2 is a sectional plan view of the apparatus shown in FIG. 1, the section being taken along section line 2—2.

Referring now to FIGS. 1 and 2, there is shown a preferred embodiment of this invention.

A glass melting and refining furnace or tank 101 is connected through a molten glass delivery facility 102 to a glass forming chamber 103 in which the delivered glass may be formed into a continuous sheet or ribbon of flat glass.

The structure of a suitable glass furnace 101 comprises a bottom 111, a front basin wall 112, side walls 113, glass discharge entrance front walls 114, glass discharge entrance side walls 115, and an overhead front wall 116. The bottom 111 and walls are refractory materials supported by structural supports (not shown). Extending downwardly across the glass discharge entrance, just downstream of the front wall 116 is a glass shutoff gate (a water-cooled shear cake made of metal may be used) or tweel 117 which is supported by a movable support 118 for raising or lowering the tweel 117. By lowering the tweel 117, which is characterized as a back-up tweel, the glass delivery facility 102 may be isolated from the furnace so that repairs may be made to it while the furnace 101 contains a pool of molten glass 119.

The molten glass delivery facility 102 includes a threshold 121 separating the pool of molten glass 119 in the furnace from molten metal in the forming chamber 103. The threshold 121 provides a support for molten glass during its delivery to the forming chamber 103 as its upper surface is a glass contacting surface. The threshold is preferably an elongated refractory block or a plurality of blocks joined together and held in compression. It may be fused cast silica, silica alumina, alumina, boron nitride or the like.

Extending upwardly at each end of the elongated threshold 121 is a jamb 122. These are preferably refractory pices that have chamfered interior faces. Overlying the threshold 121 and the jambs 122 is a roof section 123 that preferably is a suspended flat arch. Extending downwardly into the enclosed space of the delivery facility 102 through an opening in its roof 123 is a tweel 123 in a tweel 124 for controlling the rate of glass delivery through the variable size opening defined by the threshold 121, the two jambs 122 and the tweel 124. The tweel 121 is mounted on a movable support 125 so that it may be easily and controllably moved upwardly or downwardly. Its ends may be beveled or angled to be received by the chamfered interior faces of the jambs 122.

In the particular embodiment of this invention disclosed in FIGS. 1 and 2 the threshold 121 rests on a forming chamber casing extension comprising an extension casing bottom 126 (which is supported on a structural support beam 127), an extension casing end wall 128 and extension casing side walls 129. The extension casing end wall 128 may be provided with a protective covering 130 to protect it from dissolution by molten glass. For example, the end wall, side walls and bottom of the extension may be steel and the covering 130 may be a platinum plate or the end wall, side walls and bottom may be an alloy such as a tungsten-molybdenum alloy and the covering 130 a molybdenum disilicide coating bonded to the alloy plate end wall.

The threshold 121 is preferably provided with holes for receiving coolant pipes so that the temperatures of the threshold can easily be controlled during use. The threshold preferably has an upwardly convex glass-contact surface as its upper surface. As shown in FIG. 1 the back side of the threshold is preferably notched so that the top edge of the end wall 128 is isolated from the molten glass, and the glass contacting surface is of uniform composition throughout rather than being part metal (the edge of the end wall 128) and part refractory (the upper surface of an unnotched threshold).

The forming chamber 103 includes a casing bottom 131 and vertical casing walls 132. The vertical casing walls include side walls (indicated in FIG. 2), an upstream end wall (indicated in FIG. 1) and a downstream, or cold end, end wall (not shown) having an opening through which a finished sheet or ribbon of glass is withdrawn from the chamber 103. The upper portion of the casing may, and preferably is, separate from the bottom portion of the casing with the upper portion suspended from structural supports (not shown) and the bottom portion separately supported by other structural supports (not shown). With the casing separated into two portions in this manner, the walls are separated so their seams (preferably providing a space between the two portions of casing) are above a pool of molten metal in the chamber.

Disposed within the bottom portion of the casing is a refractory bottom liner 133 which may be block refractory or cast-in-place refractory. The refractory 133 may be overlaid with carbon if desired. The sides of the casing are also provided with a refractory lining 134. Residing within the bottom portion of the lined casing is a pool of molten metal 135, preferably molten tin or an alloy of tin. The upper portion of the forming chamber is provided with a refractory ceiling or roof 136 which may have electric heating elements (not shown) mounted in it. During operation a stream or layer of molten glass 137 is delivered onto the molten tin 135 and advanced along its surface while being cooled sufficiently to form the advancing glass into a dimensionally stable continuous sheet of glass 138. A service space 139 is preferably provided above the ceiling 136 with the service space fully sealed by a roof casing 140 connected to the vertical casing members 132.

The invention is particularly useful because it provides a structure that can readily accommodate the expansion of construction materials incidental to the drastic increase in temperature associated with heating a glassmaking apparatus from the ambient temperature at which it is constructed to the high operating temperature (1800°F. to 2400°F. or 980°C. to 1320°C.) at which it must operate. Since, in this embodiment, the forming chamber casing is extended over the furnace basin wall as it expands during a heat-up, it tends to seal with, rather than separate from, the furnace by sliding upstream into the furnace over the basin wall. Meanwhile there is sufficient ambient cooling of the bottom side of the bottom casing so molten glass leakage, if any, is self-sealing.

There is also an operational benefit associated with the apparatus comprising this invention. Because the upstream end of the forming chamber is urged into the furnace over its basin wall, the entire assembly is maintained in intimate thermal communication during use. Thus, the delcine in molten glass temperature during delivery is generally gradual and steady without sudden changes in cooling rate and the control of the delivered glass temperature is made quite precise. This makes further temperature control of the glass during forming a considerably easier task.

Figure 3:
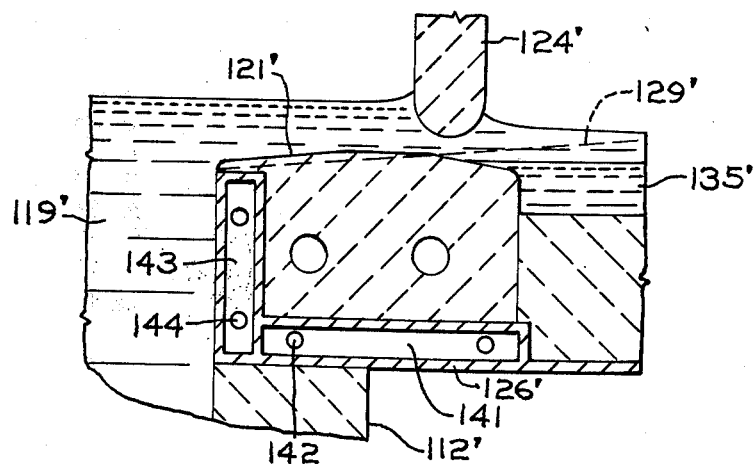
FIG. 3 is a partial, longitudinal, sectional elevation view of an alternative embodiment of the invention.

In FIG. 3 there is shown another preferred embodiment of this invention. All of the primed reference numbers refer to the same elements in the combination as the same numbers refer to in the embodiments of the invention shown in FIGS. 1 and 2. In this embodiment the casing extension is provided with coolers, rather than simple plates, as a bottom and an end wall. A box-like cooler 141 having coolant conduit openings 142 is disposed beneath the threshold 121' and welded or otherwise connected to the casing bottom plate 126' to form a continuous impervious casing beneath the chamber and delivery facility.

An upstanding box-like cooler 143, also having coolant conduit openings 144, is connected to the bottom cooler 141 and to the side wall members 129' to complete the open-topped box that is the bottom casing along with its delivery facility extension.

In this embodiment of the invention the coolers 141 and 143 may readily be constructed of structural plate steel since sufficient cooling can be provided to prevent their dissolution by molten glass.

While this invention has been described with reference to particularly preferred embodiments, those skilled in the art will recognize variations that may be made without departing from the spirit or scope of this invention. Accordingly, this disclosure is intended to be illustrative, rather than limiting. For example, it will be readily understood that a suitable impervious casing may include one or more holes or openings through it without substantially increasing the risk of molten metal leak in the event of refractory liner failure. So long as potential leak points are accessible so that external water coolers or the like can be easily applied to them in the event of leakage, no problem of significance is presented. Therefore, the expression "impervious casing" will be understood to mean a casing comprising substantially impervious material and having an insubstantial number of holes through it.

We claim:
1. In an apparatus for making flat glass comprising a glassmaking furnace having a front wall with an opening therethrough for discharging molten glass from the furnace, a molten glass delivery facility including a threshold, side jambs and an adjustably mounted tweel for receiving discharged molten glass and delivering it for forming and a glass forming chamber including a bottom casing of impervious material, a liner and, within the liner, a pool of molten metal to support delivered molten glass for forming it into a continuous sheet of glass, the improvement comprising
an impervious casing connected to and extending from the bottom casing of the forming chamber and including within it at least a portion of the threshold, wherein the extended impervious casing comprises a bottom member, upstanding side members and an upstanding end member extending transversely across the glass delivery facility, the upstanding members extending upwardly from the bottom member sufficiently above the bottom of the forming chamber to be above a substantial portion of the pool of molten metal contained therein and wherein the upper, glass-supporting surface of the threshold is exposed for contact by molten glass.

2. The apparatus according to claim 1 wherein the front wall of the furnace includes a basin wall beneath the opening which basin wall extends beyond a portion of the front wall above the opening and wherein the extended casing overlies at least a portion of the basin wall.

3. The apparatus according to claim 2 wherein the extended casing rests on the furnace basin wall and is free slide over the portion of the basin wall upon which it rests.

4. The apparatus according to claim 1 wherein the upstanding end wall is a metal plate.

5. The apparatus according to claim 4 wherein the upstanding end wall is provided with a molten glass resistant covering.

6. The apparatus according to claim 5 wherein the glass resistant covering is a cermet bonded to the upstanding end wall plate.

7. The apparatus according to claim 1 wherein the upstanding end wall comprises a cooler.

8. The apparatus according to claim 1 wherein the bottom member of the extended casing comprises a cooler.

9. The apparatus according to claim 1 wherein the threshold is substantially entirely within the extended casing and in communication with the forming chamber liner.

10. The apparatus according to claim 9 wherein the threshold is notched to provide a lip adjacent its upper surface and is positioned within the extending casing so that the lip of the threshold overlies the uppermost edge of the upstanding end wall of the extended casing.

* * * * *